US011959661B1

(12) United States Patent
Boonstra

(10) Patent No.: US 11,959,661 B1
(45) Date of Patent: Apr. 16, 2024

(54) HUMIDIFIER WITH REMOVABLE LOCATOR MODULE

(71) Applicant: NOVA HUMIDITY LLC, Zeeland, MI (US)

(72) Inventor: Keith Erwin Boonstra, Holland, MI (US)

(73) Assignee: Nova Humidity LLC, Zeeland, MI (US)

( * ) Notice: Subject to any disclaimer, the term of this patent is extended or adjusted under 35 U.S.C. 154(b) by 0 days.

(21) Appl. No.: 18/228,437

(22) Filed: Jul. 31, 2023

Related U.S. Application Data

(60) Provisional application No. 63/393,456, filed on Jul. 29, 2022.

(51) Int. Cl.

| | |
|---|---|
| ***F24F 6/14*** | (2006.01) |
| ***B01F 23/21*** | (2022.01) |
| ***B01F 23/213*** | (2022.01) |
| *F24F 6/00* | (2006.01) |

(52) U.S. Cl.
CPC ............ *F24F 6/14* (2013.01); *B01F 23/2132* (2022.01); *B01F 23/21321* (2022.01); *F24F 2006/006* (2013.01)

(58) Field of Classification Search
CPC ........... F24F 6/14; B01F 23/21; B01F 23/213; B01F 23/2132; B01F 23/21321
See application file for complete search history.

(56) References Cited

U.S. PATENT DOCUMENTS 4,211,735 A * 7/1980 Berlin ........................ F24F 6/14 261/118
4,255,360 A 3/1981 Jeffries
4,663,091 A 5/1987 Seo
(Continued)

FOREIGN PATENT DOCUMENTS

AU 2015101994 A4 8/2016
CA 2875538 A1 6/2016
(Continued)

OTHER PUBLICATIONS

International Bureau on Behalf of the International Search Authority, "International Preliminary Report on Patentability," issued in connection with PCT/US2015/016140, dated Aug. 22, 2017, 7 pages.
(Continued)

*Primary Examiner* — Robert A Hopkins
(74) *Attorney, Agent, or Firm* — Nyemaster Goode P.C.

(57) ABSTRACT

A water vapor filtration and delivery system having a water inlet coupled to a source of water, a pump for pumping an amount of water from the water inlet, a filtration unit connected to the water inlet that removes all contaminants larger than 50 nanometers, and a nozzle having an outlet orifice for distributing the filtered water vapor into a stream of air. The water vapor filtration and delivery system includes a locator module coupled to a plenum or a wall of an air duct and having a base plate attached to the plenum, a locator plate removably attached to the base plate, and at least one hand bolt. There is a flexible hose between the filtration unit and the locator module configured to transfer water from the filtration unit to the locator module and a rigid pipe between the locator plate and the nozzle.

20 Claims, 10 Drawing Sheets

(56) References Cited

U.S. PATENT DOCUMENTS

| | | | |
|---|---|---|---|
| 5,193,354 | A | 3/1993 | Kleinberger et al. |
| 5,520,854 | A | 5/1996 | Porco et al. |
| 5,884,492 | A | 3/1999 | Zwicky et al. |
| 6,092,794 | A | 7/2000 | Reens |
| 7,211,320 | B1 | 5/2007 | Cooper et al. |
| 7,419,601 | B2 | 9/2008 | Cooper et al. |
| 7,552,914 | B1 | 6/2009 | Feldstein |
| 7,934,702 | B1 | 5/2011 | Feldstein |
| 8,991,794 | B1 | 3/2015 | Boonstra |
| 9,885,487 | B2 | 2/2018 | Boonstra |
| 2004/0020998 | A1 | 2/2004 | Stueble |
| 2005/0056711 | A1 | 3/2005 | Mee |
| 2005/0212152 | A1 | 9/2005 | Reens |
| 2006/0027499 | A1 | 2/2006 | Ajayan et al. |
| 2006/0273470 | A1 | 12/2006 | Takahashi et al. |
| 2008/0157409 | A1 | 7/2008 | Reens |
| 2009/0114747 | A1 | 5/2009 | Nakada et al. |
| 2010/0305761 | A1 | 12/2010 | Remsburg |
| 2011/0163170 | A1 | 7/2011 | Feldstein et al. |
| 2013/0171033 | A1 | 7/2013 | Chen et al. |
| 2014/0097146 | A1 | 4/2014 | Shah et al. |

FOREIGN PATENT DOCUMENTS

| | | | |
|---|---|---|---|
| CN | 203955390 | U | 11/2014 |
| EP | 3259535 | A1 | 12/2017 |
| KR | 100541036 | B1 | 1/2006 |
| WO | 2013141563 | A1 | 9/2013 |
| WO | 2016133491 | A1 | 8/2016 |

OTHER PUBLICATIONS

International Search Authority, "International Search Report and Written Opinion," issued in connection with PCT/US2015/016140, dated Dec. 24, 2015, 8 pages.

European Patent Office, "Extended Search Report including Supplementary European Search Report and Search Opinion," issued in connection with European Application No. 15882829.3, dated Sep. 10, 2018, 8 pages.

Australian Government, IP Australia, "Examination Report No. 1 for Standard Patent Application," issued in connection with Australian Application No. 2015383149, dated Jun. 5, 2020, 5 pages.

* cited by examiner

HUMIDIFIER WITH REMOVABLE LOCATOR MODULE

CROSS-REFERENCE TO RELATED APPLICATION

This application claims priority to and benefit of U.S. Provisional Application No. 63/393,456, filed on Jul. 29, 2022, entitled "HUMIDIFIER WITH REMOVABLE LOCATOR MODULE," the entire disclosure of which is hereby incorporated herein by reference.

BACKGROUND

Humidifiers within heating, ventilation, and air conditioning (HVAC) units may be highly inefficient and difficult to inspect. If the nozzle is too large, the droplets introduced into the airstream may be too heavy to be suspended and may fall out of the airstream, and not humidify the air. Conversely, if the nozzle is too small, particles within the water may clog up the nozzle, rendering it unfunctional. To check and clear the nozzle is a cumbersome and time-consuming task that may require specialized tools and knowledge to prevent permanent damage to the HVAC ductwork.

SUMMARY

One aspect of the present disclosure includes a water vapor filtration and delivery system having a water inlet coupled to a source of water, a pump for pumping an amount of water from the water inlet, a filtration unit connected to the water inlet that removes all contaminants larger than 50 nanometers, and a nozzle having an outlet orifice for distributing the filtered water vapor into a stream of air. The water vapor filtration and delivery system includes a locator module coupled to a plenum of an air duct and having a base plate attached to the plenum, a locator plate removably attached to the base plate, and at least one hand bolt. There is a flexible hose between the filtration unit and the locator module configured to transfer water from the filtration unit to the locator module and a rigid pipe between the locator plate and the nozzle.

Another aspect of the present disclosure includes a locator module for positively locating a nozzle within a plenum in order to humidify an airstream within the plenum. The locator module includes a base plate attached to the plenum, a locator plate removably attached to the base plate and coupled to a flexible, high-pressure hose having an amount of filtered, high-pressure water, at least one hand bolt configured to hold the locator plate to the base plate, and a rigid pipe extending from the locator plate in a direction opposite the flexible, high-pressure hose, the rigid pipe having a nozzle at a distal end from the locator plate. The nozzle is disposed at an angle from the rigid pipe such that the amount of filtered, high-pressure water is dispersed with the airstream in a direction of flow of the airstream.

Yet another aspect of the disclosure includes a method of removably locating a nozzle from a humidifying system by fixedly attaching a base plate having a center aperture to an exterior surface of a plenum of a duct, locating a rigid pipe to a locator plate, the rigid pipe having a nozzle at a distal end from the locator plate, the nozzle facing generally in the direction of airflow within the duct, attaching a flexible, high-pressure hose to the locator plate on an opposite side from the rigid pipe such that filtered, high-pressure water is delivered from the flexible, high-pressure hose to the rigid pipe, removably coupling the locator plate to the base by rotating an indentation on the locator plate into contact with a hand bolt rotatably coupled to the base plate, fixing the locator plate to the base plate by rotating the hand bolt such that a handle of the hand bolt is in frictional contact with the locator plate, wherein the hand bolt is rotated by hand and without the use of tools.

These and other aspects, objects, and features of the present invention will be understood and appreciated by those skilled in the art upon studying the following specification, claims, and appended drawings.

DETAILED DESCRIPTION

Figure 1:
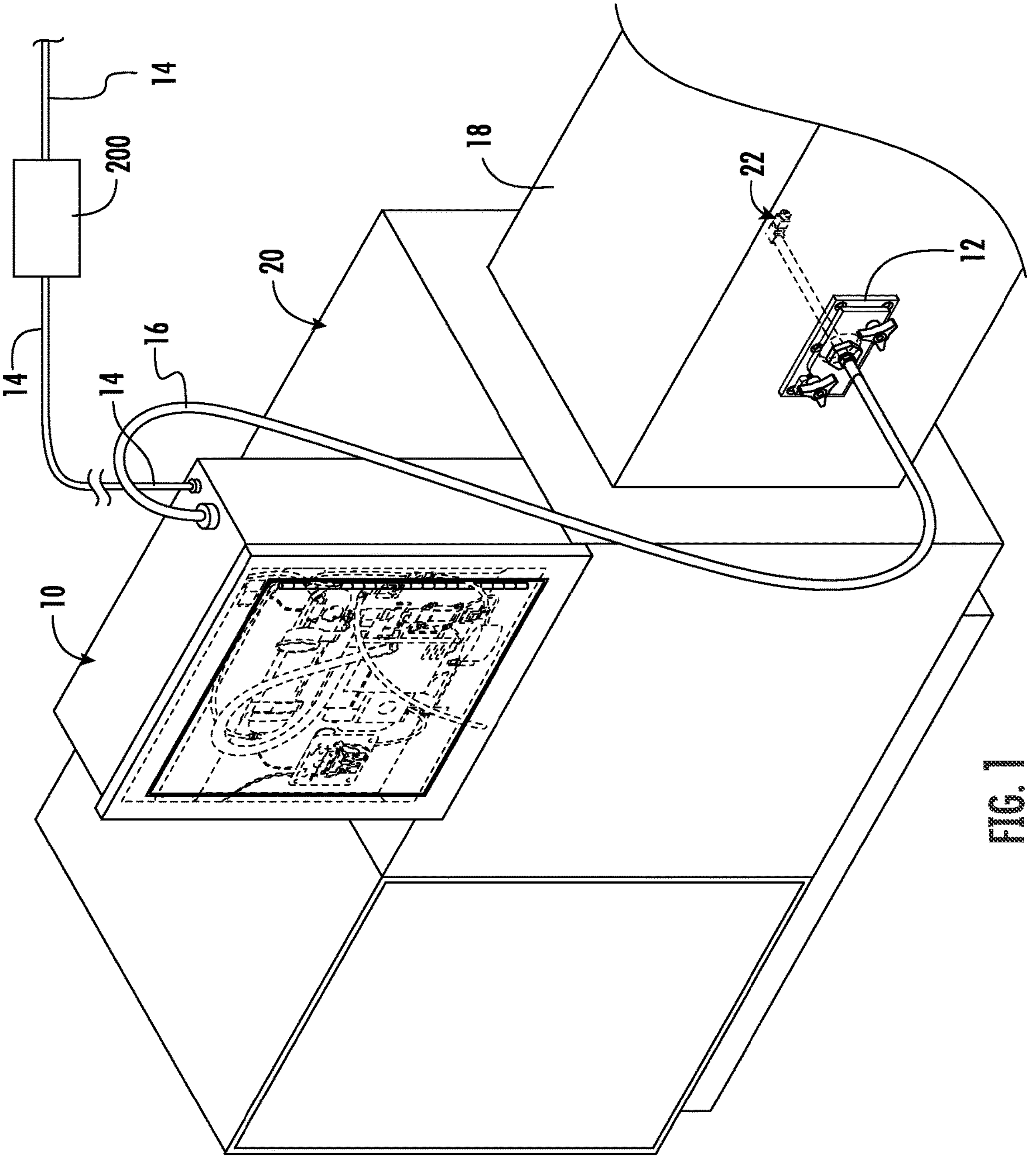
FIG. 1 is a perspective view of the humidifier, filtration system, and locator module of an embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the scope of the present disclosure. The upper and lower limits of these smaller ranges may independently be included in the smaller ranges, and are also encompassed within the scope of the present disclosure, subject to any specifically excluded limit in the stated range. Where the stated range includes one or both of the limits, ranges excluding either or both of those included limits are also included in the scope of the present disclosure.

The illustrated humidifier system 10 in FIG. 1 is shown as part of a larger ventilation system or heating and air conditioning unit 20. One or more such ventilation systems are typically present in residential, industrial, or commercial building structures. The humidifier may be directly associated with the ventilation system or remotely located and operably associated with such a ventilation system. While conceivably the humidifier could be used alone, it is typically used in conjunction with the larger ventilation system or heating and/or air conditioning unit 20. The systems work synergistically together to deliver clean humidified air to all or a subset of spaces within a building or structure. The purified water vapor or mist may be injected into the air ducting or plenum 18 at any location along the airflow path of the ducting in the structure. For instance, the humidifier may be placed near the heating and air conditioning unit 20, or multiple humidifiers may be individually calibrated and placed closer to the rooms or spaces to be modified, while still allowing enough space for the humidity from the nozzle 22 to substantially infiltrate the airstream. The humidifier functions to affect humidity conditions within an atmosphere and may be tailored to specific needs of different rooms or spaces within the residential, industrial, or commercial building structure.

Figure 2:
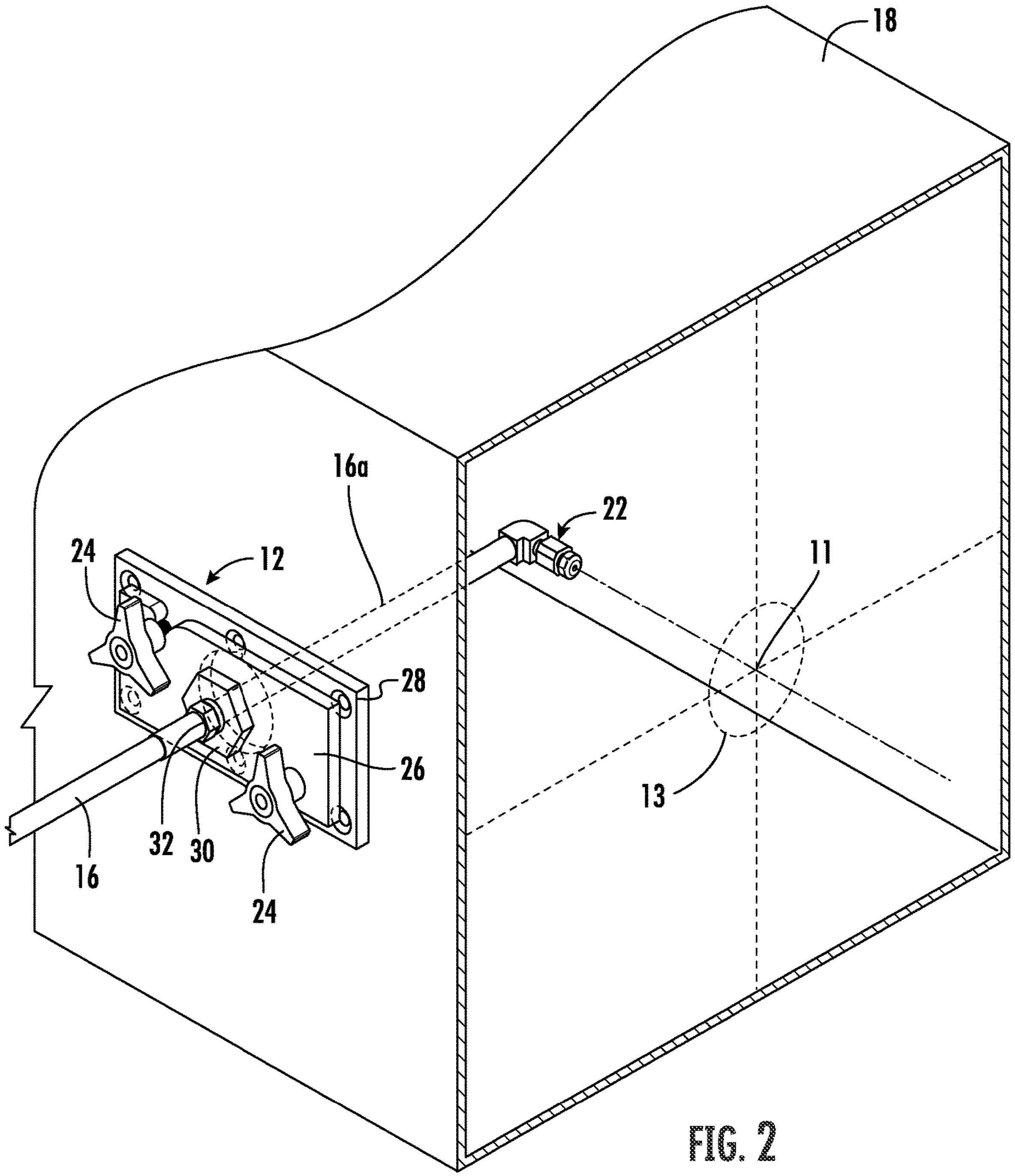
FIG. 2 is a cutaway view of the plenum of a duct showing the locator module and nozzle of an embodiment.

To get the most efficient addition of the moisture into the airstream, a nozzle 22 may be placed in the airstream. As shown in FIG. 2, the nozzle 22 may be placed substantially in the middle of the plenum or ductwork 18 and the exit direction of the nozzle 22 may point generally in the direction of airflow within the plenum or ductwork 18. Smaller droplets of water vapor are preferred to be introduced into the airflow, as they are affected more by the airflow within the plenum or ductwork 18 and less by gravity which tends to pull the water droplets downwardly out of the airflow and onto the lower wall of the plenum or ductwork 18. Very small water droplets entering the airstream ensures that the moisture or water vapor joins the airflow with the least amount of resistance and is delivered to the intended rooms or spaces in the most efficient way possible and evaporates quickly. The nozzle typically includes strainer, a pressure check value and an orifice wherein the pressure check valve has a cracking pressure of 43.5 psi or higher or 180 psi or higher or 250 psi or higher.

In the illustrated example shown by FIG. 1, external or municipal water enters the system into a main via a municipal water supply 14. The municipal water is routed through a filtration module of the humidifier system 10, where the water enters at household temperature and pressure, and exits through high-pressure tube, which is typically a flexible hose 16, as high-pressure, highly filtered, and very pure water. The municipal water supply 14 enters a main HVAC cabinet, typically an air conditioning unit 20, but the water supply, which is typically a municipal water supply 14, may enter the system directly in the humidifier system 10 as shown in FIG. 1. The high-pressure and filtered water then exits the humidifier system 10 through a high-pressure tube, which is typically a flexible hose 16, and is presented into the airstream through a nozzle 22 located within the plenum or ductwork 18 as near the center portion 13 of the plenum or ductwork 18 as is practicable.

The high-pressure tube enters the plenum or ductwork 18 through a locator module 12 attached to a side of the plenum or ductwork 18. The high-pressure tube, typically a high-pressure flexible hose 16 is coupled to a rigid pipe **16*a* that is fixedly attached to the locator module 12 and allows water to pass therethrough. The rigid pipe 16*a* includes a nozzle 22 at a distal end from the locator module 12, and allows the locator module 12 to locate and hold fixed the nozzle 22 in the desired position within the plenum or ductwork 18. The nozzle is typically positioned to provide aspirated moisture in the center up to 20% (within 10% of the cross-sectional area (approximated by the area of circle of center portion 13 in FIG. 2) around the center point 11 of the cross-sectional surface area of the duct, but more typically the nozzle is positioned at about the center portion 13 or at the exact center 11** and in line with the airflow through a duct of the ducting and in the direction of the airflow.

By using a setup such as shown in FIG. 1, any currently existing and typical source of water may be used as a water source to then inject very fine, highly filtered purified water vapor into an airstream to humidify the interior of a home or other building.

Figure 3:
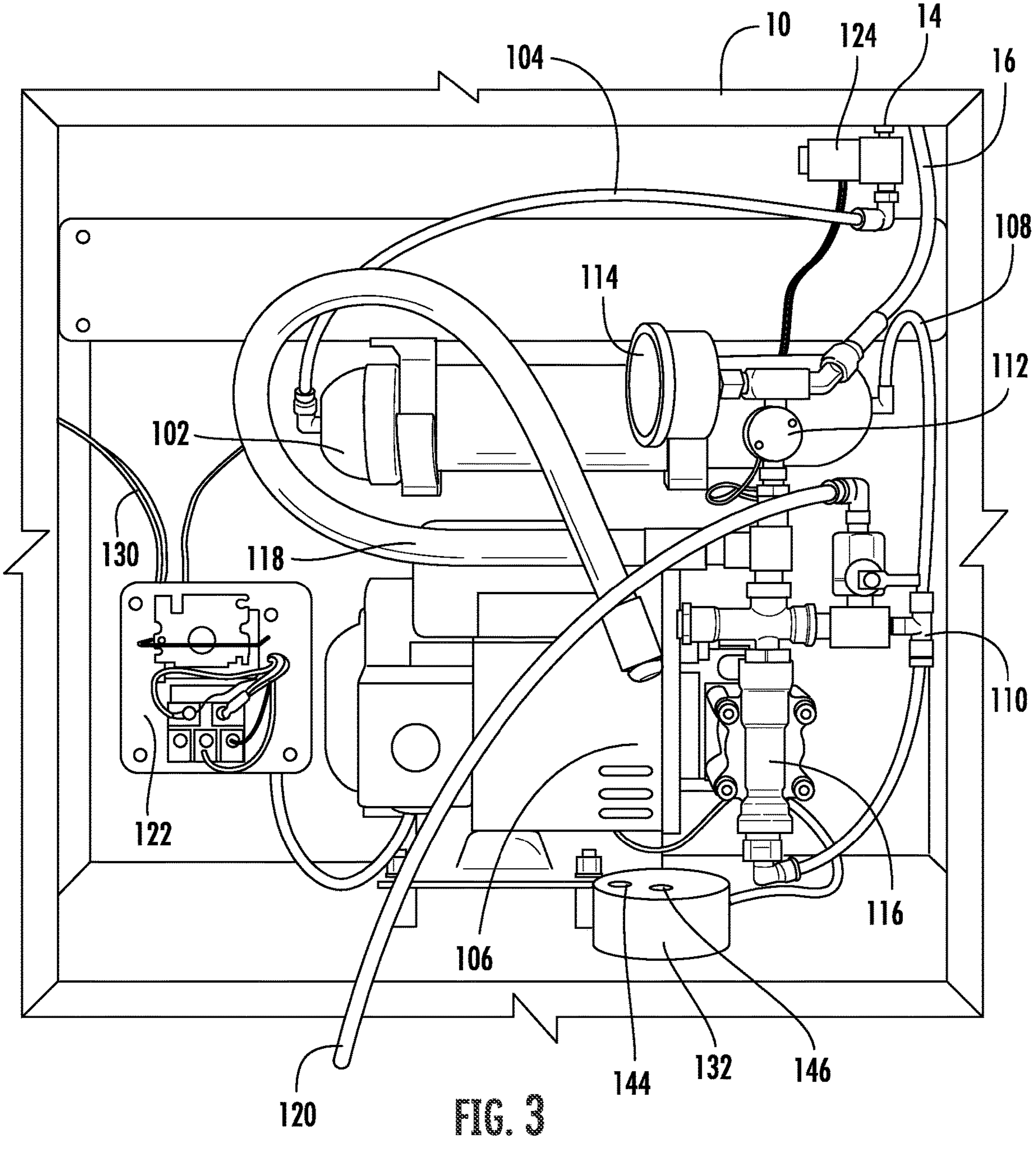
FIG. 3 is an interior view of a filtration system showing the components of an embodiment to receive municipal water and deliver highly-filtered, high-pressure water to the nozzle.

Looking closer at the humidifier system 10 in FIG. 3, the humidifier system includes a water filtration module, which can be a water filtration unit, from which a pump 106 moves, and more typically draws, water to be filtered. The municipal water enters the humidifier system 10 from a typical municipal water supply tube 14 and travels through a solenoid valve 124 that controls the amount of water entering the humidifying system. From the solenoid valve 124, the water passes through a water filter 102. Because the purity of the water used by the humidifier proportionally enhances the function of the humidifier, additional water filters or water filter systems 200 may be incorporated in series along with the BLUACT™ or similar filter which shall further purify the incoming water of the system. These filters may be contained within the same housing or be positioned remotely from the main humidifier systems of the present disclosure as shown in FIG. 1. These additional filtration system(s) (there may be more than one is parallel or in series supplying the humidifier systems of the present disclosure) are optional. They may also be positioned within a separate housing proximate the humidifier system and in-line with the municipal water source to initially treat the water from the municipal water source or other water source such as a water well. These external and additional filters typically contain particulate size filters which will filter out substantially all (typically all but about 5% or less or all but about 1% of particulates over the size of 50 nanometers) or all particulates over the size of 50 nanometers, either without the use of a BLUACT™ type of filter discussed herein, or as additional, separate filtration in series with a BLUACT™ type filter to refine the purity of the water and extend the life of the BLUACT™ amyloid fibril filter system. Such additional available filters may include reverse osmosis filter(s), which utilize pressurized water contaminant particulate size filtration.

The water filter 102 purifies water by removing bacteria, viruses, cysts, metals, and other contaminants without the need for heat, ultraviolet light, chemicals, or electricity. As discussed above, the filter may be a BLUACT™ filter such as that as disclosed in U.S. Pat. No. 11,091,375, which is hereby incorporated by reference in its entirety. The BLUACT™ brand water filters are typically a composite material comprising (a) amyloid fibrils; (b) activated carbon; and (c)

optionally a support material; whereby the amyloid fibrils and said activated carbon are in intimate contact. Using a filter such as the BLUACT™ filter allows the use of the nozzle 22, which is typically a very small nozzle as described herein, shown in combination with the high water pressure necessary for the proper vaporization of the water into vapor that will properly humidify the atmosphere of the desired spaces. The electrical and mechanical elements within the humidifier system 10 are controlled by a control board 122 mounted on top of a transformer, which is electrically energized by a 120V and low voltage (24 volt) control inputs 130.

From the water filter 102, the now-filtered water travels through a typically elastomeric tube 108 into a manifold 116 coupled to the pump 106. The pump 106 draws the water from the municipal water supply 14 and increases the pressure of the water to near or above 1000 psi, and prepares the water for insertion into the airstream. In most commercial or industrial applications, the noise produced by the pump 106 in operation will be less than 70 decibels and will be unnoticeable while in use. In applications where the maximum volume level of 70 decibels is considered acceptable, the pump 106 may be a standard "4-pole" electric motor, such as that produced by ABB Motors and Mechanical Inc., formerly BALDOR®, which theoretically rotates at a nominal 1800 rpm. Other applications of the present disclosure may require a quieter motor, in those cases the pump 106 may be a "6-pole" motor such as that produced by ABB Motors and Mechanical Inc., formerly BALDOR®, which rotates at a nominal 1200 rounds per minute and will result in a low noise level. Lower volume systems are advantageous in various environments such as in hospitals or homes where people may be sleeping or resting within the vicinity of the humidifier system.

A solenoid valve 112 positively closes the water supply when the humidifier is not energized. When the solenoid valve 112 is open, the high-pressure filtered water is then moved through a flexible hose 16, typically braided metal to handle the high pressure of the moving water, and exits the humidifier system 10. A pressure gauge 114 and a high-pressure relief hose 118 may be attached between the pump 106 and the flexible hose 16.

Another possible aspect of the humidifier system 10 is a water switch 132 within the humidifier system 10 that is electrically connected to the pump 106 and the control board 122 that will cut off power from the control board 122 to the pump 106 if the water switch 132 detects water outside the plumbed system. After the water switch 132 detects water outside the plumbed system, the water switch 132 will require manual resetting to resume the electrical connection between the control board 122 and the pump 106. The water switch 132 may also be electrically connected to an audible alarm that is activated when the water switch 132 detects water outside the plumbed system. The water switch 132 also typically has illuminated indicators 144 and 146. Indicator 144 is typically red to indicate a water switch has been tripped and indicator 146 is typically green to show that the switch is ready and not tripped.

Another potential aspect of the humidifier system 10 is a thermal switch that is electrically connected to the control board 122 and the pump 106, wherein the thermal switch will cut off electrical power from the control board 122 to the pump 106 if the pump 106 exceeds a predetermined temperature to prevent damage caused by excess pressure, lack of water supply, or lack of pump lubrication, among other causes, which may potentially damage the pump 106. The thermal switch typically requires manual resetting after correction of the cause of its activation.

Figure 4:
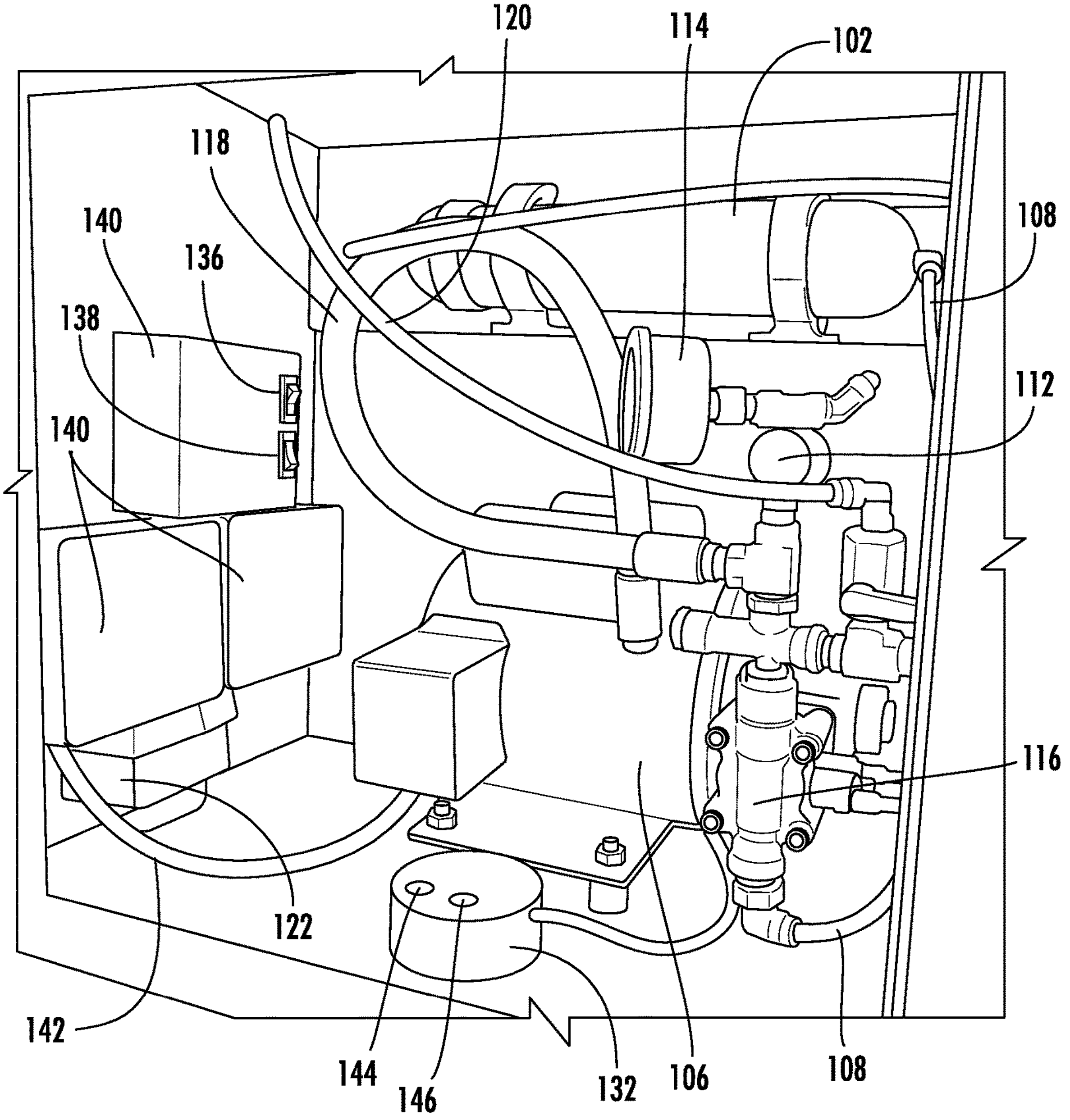
FIG. 4 is an interior view of a filtration system showing the components of an embodiment to receive municipal water and deliver highly-filtered, high-pressure water to the nozzle.

As shown in FIG. 4, humidifier systems 10 of the present disclosure may employ RIB (Relay-in-box) controls 140, which are an enclosed control system. The RIB system encloses the controls of the humidifier to facilitate and ensure the dependable operation and safe technician service of the humidifier system. The RIB system may have one or a plurality of rocker switches 136, 138. Switch 136 typically controls the solenoid valves, one at the water point of entry (solenoid valve 124) and another at the exit (solenoid valve 112) from the cabinet. In the middle position, both solenoid valves are both off. In a first rocked position, the switch allows the overall system to run in an automated fashion. In a second rocked position (downward, for example) that is opposite the first rocked position, a manual override position, which opens the solenoid valves regardless of any other condition of the overall humidifier system 10. The bottom rocker switch 138 has an overall system off when the rocker switch is in the center position the overall system is powered off. When switch is up the system is set to automatically activate the pump when the systems is calling for humidity based on the call from the humidistat located in the room or volume of air within the building to be humidified. Power to the motor may be provided from a relay in box 140 via power cord 142.

Figure 5:
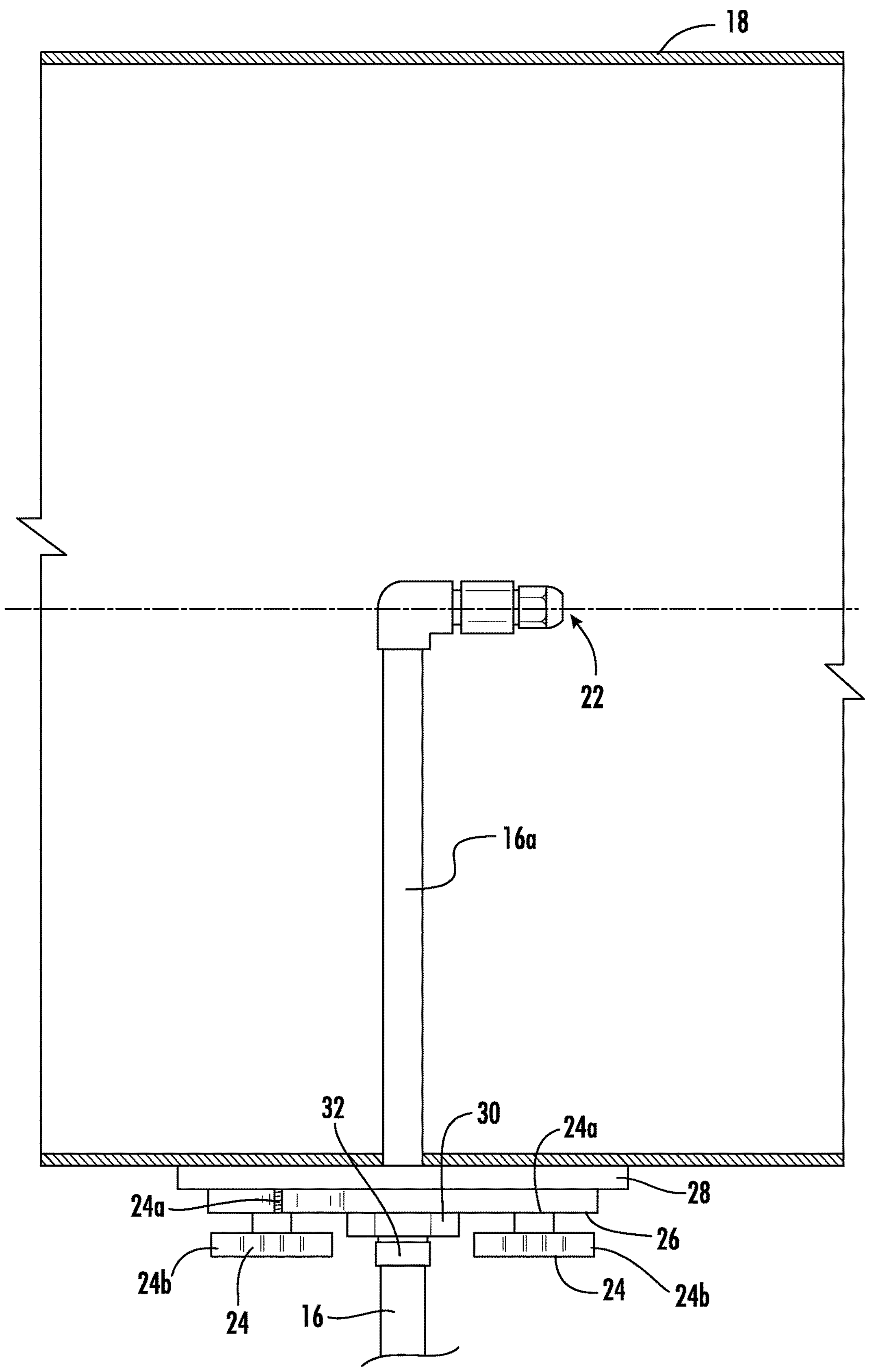
FIG. 5 is a top sectional view of the plenum of a duct showing the locator module and nozzle of an embodiment.
Figure 6:
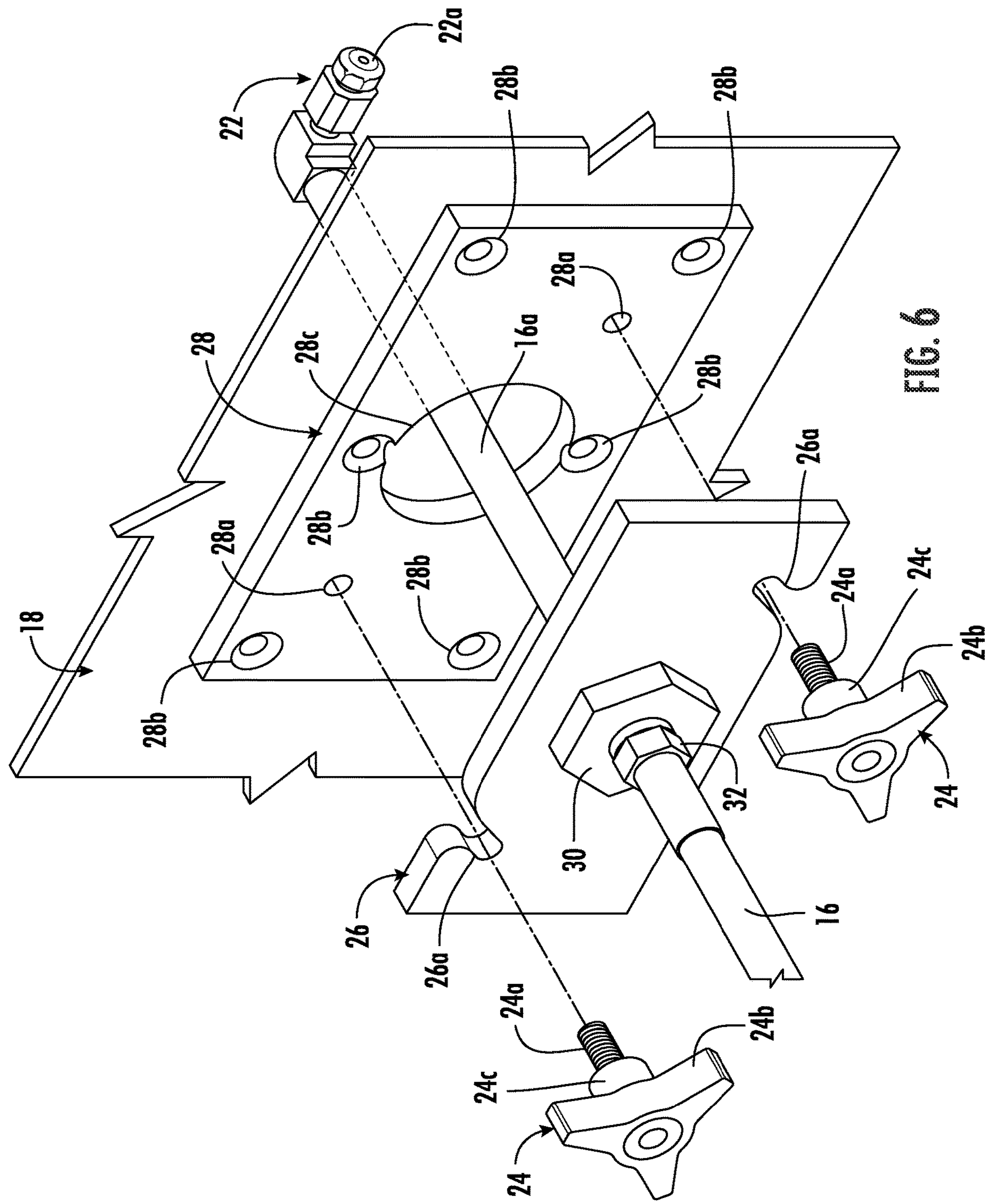
FIG. 6 is an exploded upper front perspective view showing the components of an embodiment of the locator module and nozzle attached to a cutaway view of the plenum of a duct.

Looking at FIG. 5, the flexible hose 16 extends from the humidifier system 10 to the area of the HVAC system where the humidity is to be introduced. The flexible hose 16 is coupled to the locator module 12 where the high-pressure, filtered water passes into a rigid pipe **16*a*. As shown in FIG. 6, the flexible hose 16 is removably coupled to the bulkhead fitting 30, which is treaded female configuration on both sides of the attachment plate 26, using a mechanically crimped fitting 32, which is typically a ⅛ inch male pipe thread at one end of the flexible hose 16, typically a flexible high pressure hose, to securely engage the mechanically crimped fitting 32 to the bulkhead fitting 30. The bulkhead fitting 30** is typically secured using a wrench or other similar tool.

Figure 7:
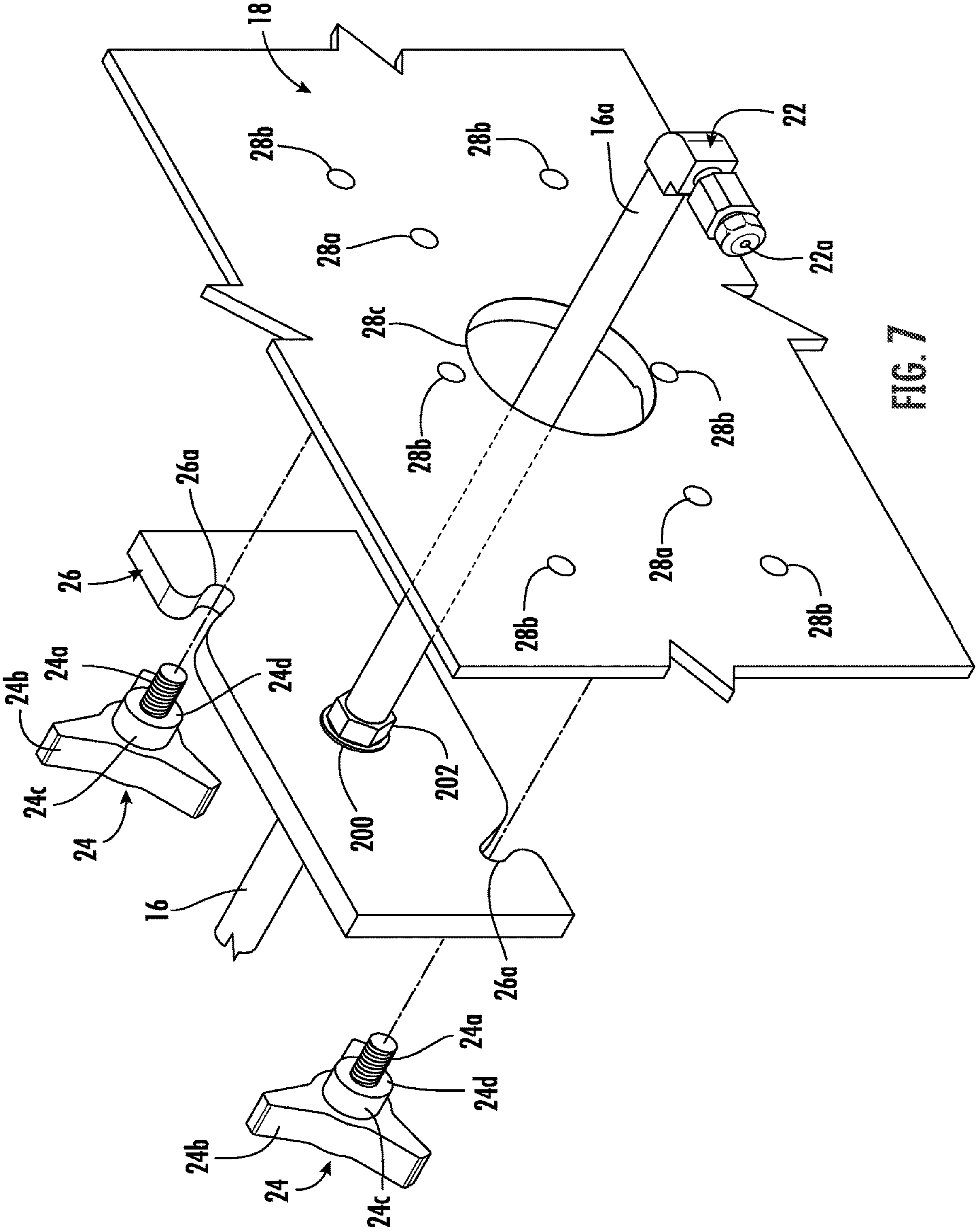
FIG. 7 is an is an exploded upper rear perspective view showing the components of an embodiment of the locator module and nozzle attached to a cutaway view of the plenum of a duct.

As shown in FIG. 7, the other female end of the bulkhead fitting is engaged to the attachment plate using a lock washer 200 and a nut 202 are typically used to secure the bulkhead fitting to the attachment plate. The rigid pipe **16*a* has a threaded end opposite the nozzle 22 that is externally threaded that is screwed into engagement with the interior threaded end of the bulkhead fitting that is opposite the side engaged to the flexible hose 16. The nozzle 22 is attached at a distal end of the rigid pipe 16*a* and terminates substantially in the middle of the plenum or ductwork 18. The nozzle 22 has an outlet orifice 22*a* that is pointed substantially in the direction of the airflow as the airstream passes through the plenum or ductwork 18**.

The locator module 12 is designed to both hold the nozzle 22 in the desired position substantially in the middle of the plenum or ductwork 18 or ducting of the building where the humidifier systems is employed and to easily remove and then replace the nozzle 22 back in its desired position for inspection purposes or the like.

FIGS. 6 and 7 show an exploded views of the locator module 12 from the front and the back respectively. The locator module 12 may include a base plate 28 that is fixedly attached directly to the outer wall of the plenum or ductwork 18. As shown, the base plate 28 includes holes **28*b* to insert machine screws (not shown) through the base plate 28 and into receiving nuts in the plenum or ductwork 18, although it should be known that the base plate 28 may be fixedly attached to the plenum or ductwork 18 in any way known in the art. The base plate 28 may also include threaded holes 28***a* that allow the hand bolts 24 to removably attach to the base plate 28. The base plate 28 further includes a nozzle hole 28*c*. The nozzle hole 28*c* lines up with an aperture in the plenum or ductwork 18 which allow the nozzle 22 and the pipe, typically the rigid pipe 16*a*, to be inserted into the interior of the plenum or ductwork 18 and into the airstream.

An attachment plate 26, which is typically removably and more typically removable by hand and without the use of tools, may be placed over the base plate 28. The attachment plate 26 includes couplings for the flexible hose 16 facing the exterior of the plenum or ductwork 18 and the rigid pipe 16*a* facing the interior of the plenum or ductwork 18. As detailed below, the attachment plate 26 may include indentations 26*a* which allow space for the hand bolts 24 to extend through and allow for the attachment plate 26 to be rotated out of position when the hand bolts 24 are loosened. The indentations 26*a* may not be symmetrically located about the nozzle hole 28*c*. By placing the indentations 26*a* at different distances from nozzle hole 28*c*, the indentations 26*a* act as a poka-yoke preventing the attachment plate 26, which is typically a removable attachment plate, from being placed on the plenum or ductwork 18 in the wrong orientation. Similarly, the threaded apertures that receive the threaded portions of the hand bolts are correspondingly offset. This configuration prevents the user from installing the nozzle in the wrong direction such as facing into the airflow direction within the ductwork or plenum. In other words, it ensures that the nozzle is installed such that aspirated moisture from the nozzle is provided in the same direction as the airflow within the ductwork or plenum of the system.

At certain times, it may be necessary for the nozzle 22 to be inspected for debris or perhaps simply to ensure that the nozzle 22 is functioning correctly. Currently, this requires much time and effort to disassemble the assembly holding the nozzle 22 in place, and in certain cases removing at least a side of the plenum or ductwork 18 to be able to reach and see inside the plenum or ductwork 18 to ensure proper functioning of the nozzle 22 within the airstream.

As detailed in FIGS. 5-10, the locator module 12 makes this process quick and easy and does not require any tools or special knowledge. FIG. 6 shows the plenum or ductwork 18 and the locator module 12 in their normal functioning state with the nozzle 22 in the center of the plenum or ductwork 18 and the outlet orifice 22*a*, which may be a nozzle 22 aperture, facing in the direction of airflow. The attachment plate 26 is located properly and held in place by frictional engagement of the hand bolts. The hand bolts typically include handles 24*b* of the hand bolts 24 which are tightened to exert pressure against the attachment plate 26 by engaging the attachment plate facing surface 24*d* of the collar 24*c* of the hand bolts with the outwardly facing surface of the attachment plate to hold it in place while the system is in use and not being observed for issues with the nozzle or other maintenance reasons.

Because the nozzle 22 is attached to the end of a rigid pipe 16*a* fixedly attached to the attachment plate 26 of the locator module 12, it is a simple measurement from the inside face of the attachment plate 26 to the middle of the plenum or ductwork 18 that defines the necessary length of the rigid pipe 16*a* to place the nozzle 22 in the proper lateral position. The nozzle 22 is placed in the proper vertical position within the plenum or ductwork 18 simply by locating the locator module 12 in the middle of the plenum or ductwork 18 in the up/down direction.

When the nozzle 22 needs to be inspected, the hand bolts 24 may be loosened by rotating the handles 24*b*. Although the hand bolts 24 may not need to be removed completely from the locator module 12, they can be if necessary. The hand bolts 24 may include large heads or handles 24*b* that allow the bolts, which are typically the hand bolts 24, to be tightened and loosened by hand and without any external tools.

Figure 8:
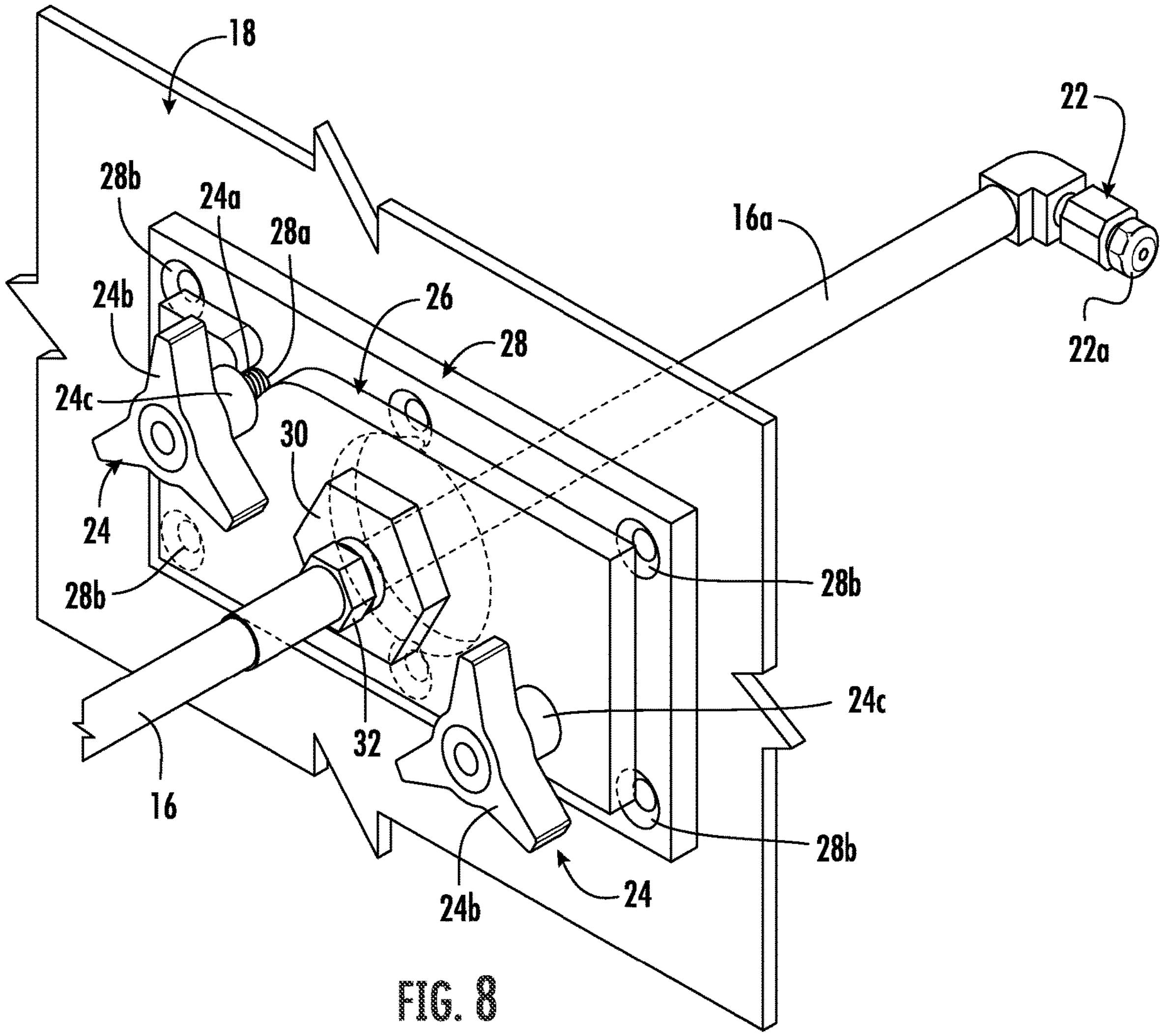
FIG. 8 is a cutaway perspective view of the locator module of an embodiment in the fixed position attached to the plenum of a duct.
Figure 9:
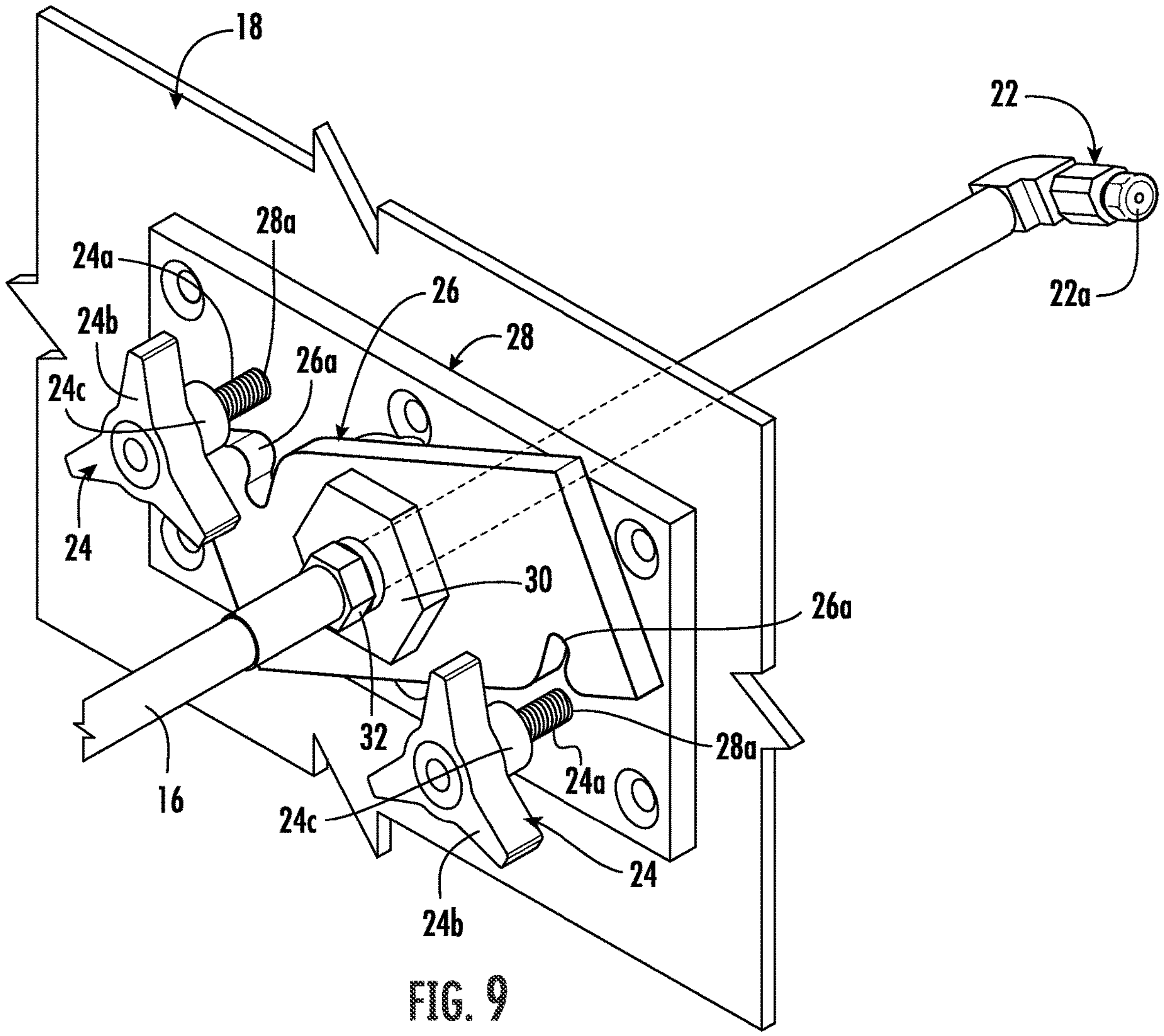
FIG. 9 is a cutaway perspective view of the locator module of an embodiment between the fixed position and the viewable position attached to the plenum of a duct.
Figure 10:
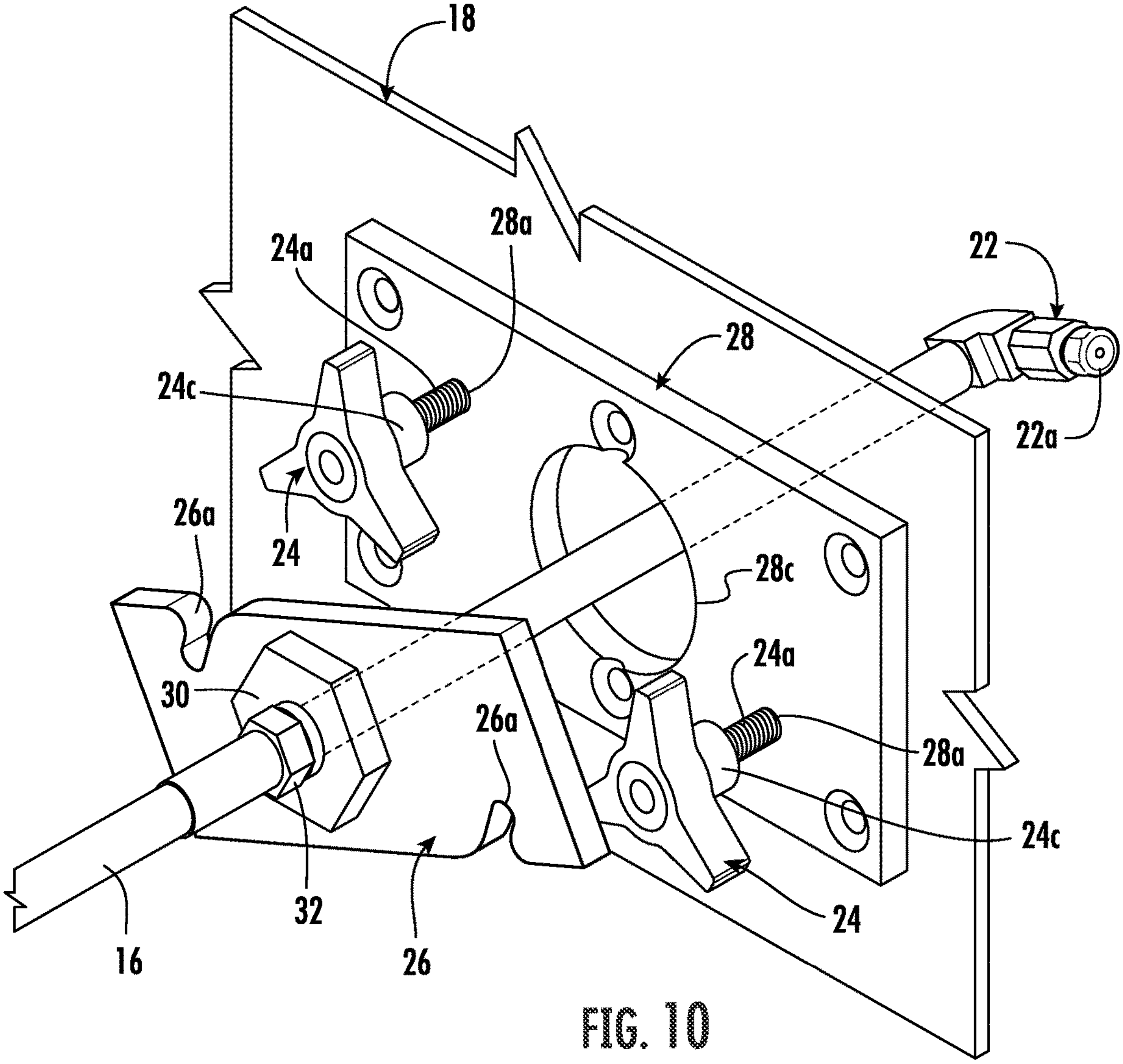
FIG. 10 is a cutaway perspective view of the locator module of an embodiment in the viewable position attached to the plenum of a duct.

Moving to FIG. 7, once the hand bolts 24 are loosened, the attachment plate 26 may be rotated such that the indentations 26*a* are freed from the threaded bolt portions 24*a* of the hand bolts 24, and the attachment plate 26 is no longer held in place by the bolts, which are typically the hand bolts 24. As shown in FIG. 8, the attachment plate 26 may be removed from the plenum or ductwork 18, typically the outer wall of the plenum or ductwork, bringing the rigid pipe 16*a* and the nozzle 22 with it. The nozzle 22 may then be moved far enough such that it is visible through the nozzle hole 28*c* and easily inspected. The system further may be energized to ensure water vapor is exiting through the outlet orifice 22*a* properly.

The nozzle 22 includes a polypropylene filter having filtration porosity of approximately seventy microns. The outlet orifice 22*a* of the nozzle 22 has a diameter of typically approximately 0.008 inches or less. While passing through the nozzle 22, the filtered water is subjected to high pressure of approximately 3,000 psi or less or, more typically, about 1,000 psi or less, and most typically between 800-1000 psi. Water flows through the nozzle 22 at a rate of between the range of at least 1.38 to 1.50 gallons per hour. The high pressure combined with the small outlet orifice diameter expels the filtered water into the atmosphere in atomized form. Most importantly, the particle size is typically small enough to dissipate or evaporate within about 10 seconds. Such pure vapor provides the ability to humidify a space, while preventing the introduction of contaminants into the atmosphere.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A water vapor filtration and delivery system comprising:

a water inlet configured to be coupled to a source of water;

a pump for pumping an amount of water from the water inlet;

a filtration unit connected to the water inlet that removes all contaminants larger than 50 nanometers;

a nozzle for distributing filtered water vapor into a stream of air, wherein the nozzle comprises an outlet orifice;

a locator module coupled to a wall of an air duct that is part of a ductwork system of a building, the locator module comprising a base plate fixedly attached to the wall of the air duct, a locator plate removably attached to the base plate, and at least one hand bolt;

a flexible hose between the filtration unit and the locator module configured to transfer water from the filtration unit to the locator module;

a rigid pipe between the locator plate and the nozzle; and wherein the rigid pipe extends at least from the wall of the air duct to approximately a center of a perpendicular cross-section of the air duct such that the nozzle is rigidly positioned within a center portion of the air duct and configured and positioned to provide water through the nozzle in line with a direction of airflow of air moving through the air duct.

2. The water vapor filtration and delivery system of claim 1, wherein the pump increases a pressure of the amount of water to no less than 1000 psi.

3. The water vapor filtration and delivery system of claim 2, wherein the outlet orifice has a diameter no larger than 0.008 inches.

4. The water vapor filtration and delivery system of claim 3, wherein the flexible hose is a metal braided hose configured to transfer the amount of water at the pressure of at least 1000 psi.

5. The water vapor filtration and delivery system of claim 1, wherein the flexible hose is a metal braided hose configured to transfer the amount of water at a pressure of at least 3000 psi.

6. The water vapor filtration and delivery system of claim 1, wherein the locator module comprises two hand bolts.

7. The water vapor filtration and delivery system of claim 6, wherein the locator plate is removable from the base plate when the two hand bolts are loosened.

8. The water vapor filtration and delivery system of claim 1, wherein the locator plate has a fixed position when attached to the base plate and a viewable position when removed from the base plate.

9. The water vapor filtration and delivery system of claim 8, wherein the water vapor filtration and delivery system provides water vapor when the locator plate is in the fixed position and in the viewable position, and wherein the nozzle is viewable through a center aperture of the base plate, allowing a user to inspect whether the nozzle is functioning to provide the water vapor.

10. A water vapor filtration and delivery system to humidify an airstream within a plenum or an airflow duct, the water vapor filtration and delivery system comprising:

a filtration unit;

a pump;

a water source in connection with the filtration unit;

a base plate having an aperture fixedly attached to a wall of the plenum or a wall of the airflow duct within a building;

a locator plate removably attached to the base plate;

a bulkhead fitting engaged to the locator plate and coupled to a hose capable of withstanding at least 3000 psi of water pressure and a rigid pipe;

two hand bolts that are offset and asymmetrically positioned from one another and are engaged with the locator plate and the base plate;

wherein the rigid pipe extends from the locator plate in a direction opposite the hose, the rigid pipe having a nozzle at a distal end from the locator plate and opposite the bulkhead fitting;

wherein the nozzle is positioned such that filtered water at a pressure of at least about 800 psi is dispersed within the airstream in a direction of flow of the airstreams; and wherein the filtration unit is fed water from the water source by the pump and filters the water before delivering it to the hose.

11. The water vapor filtration and delivery system of claim 10, wherein the nozzle comprises an outlet orifice having a diameter no larger than 0.008 inches.

12. The water vapor filtration and delivery system of claim 11, wherein the nozzle delivers filtered water at a pressure of at least about 1000 psi and the wherein the nozzle is disposed at a ninety degree angle from the rigid pipe and the nozzle includes strainer, a pressure check valve and the outlet orifice, wherein the pressure check valve has a cracking pressure of 43.5 psi or higher.

13. The water vapor filtration and delivery system of claim 12, wherein the locator plate is removable from the base plate by hand and without the use of tools using hand knobs on the two hand bolts wherein the hand knobs have at least two outwardly extending arms.

14. The water vapor filtration and delivery system of claim 13, wherein the two hand bolts are loosed by hand and without the use of tools.

15. The water vapor filtration and delivery system of claim 14, wherein the locator plate further comprises a first indentation and a second indentation, and the two hand bolts fit within the first indentation and the second indentation when the locator plate is in a fixed position.

16. The water vapor filtration and delivery system of claim 15, wherein the first indentation is a first distance from a center aperture and the second indentation is a second distance from the center aperture and the first distance and the second distance are different distances and at least 5% different from one another and the first indentation and the second indentation are moved out of contact with the two hand bolts when the locator plate is in a removed position.

17. The water vapor filtration and delivery system of claim 16, wherein the nozzle is disposed in a humidifying position near a center of the plenum when the locator plate is in the fixed position, and the nozzle is viewable through the center aperture in the base plate when the locator plate is in the removed position and the first indentation is a non-linear cutout and the second indentation is a non-linear cutout.

18. The water vapor filtration and delivery system of claim 17, wherein the nozzle is functional when the locator plate is in the fixed position and in the removed position.

19. The water vapor filtration and delivery system of claim 12, further comprising a control board and a water switch in communication with the pump, wherein the control board stops the pump when the water switch detects water.

20. The water vapor filtration and delivery system of claim 12, further comprising a control board and a thermal switch in communication with the pump, wherein the control board stops the pump when the thermal switch detects a temperature above a predetermined temperature amount.

* * * * *